US012643828B2

(12) United States Patent
Shim et al.

(10) Patent No.: US 12,643,828 B2
(45) Date of Patent: Jun. 2, 2026

(54) METHOD OF FORMING A BARRIER LAYER ON A CERAMIC MATRIX COMPOSITE

(71) Applicant: Rolls-Royce High Temperature Composites Inc., Cypress, CA (US)

(72) Inventors: Sungbo Shim, Irvine, CA (US); Robert Shinavski, Mission Viejo, CA (US); Pathikumar Sellappan, Seal Beach, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 1338 days.

(21) Appl. No.: 16/922,609

(22) Filed: Jul. 7, 2020

(65) Prior Publication Data

US 2021/0024426 A1     Jan. 28, 2021

Related U.S. Application Data

(60) Provisional application No. 62/876,885, filed on Jul. 22, 2019.

(51) Int. Cl.
| | |
|---|---|
| *C04B 35/78* | (2006.01) |
| *C04B 41/45* | (2006.01) |
| *C04B 41/50* | (2006.01) |

(52) U.S. Cl.
CPC .......... *C04B 35/78* (2013.01); *C04B 41/4545* (2013.01); *C04B 41/4558* (2013.01); *C04B 41/4584* (2013.01); *C04B 41/5066* (2013.01); *C04B 41/5096* (2013.01); *C04B 2235/616* (2013.01)

(58) Field of Classification Search
None
See application file for complete search history.

(56) References Cited

U.S. PATENT DOCUMENTS 4,869,943 A * 9/1989 Corbin ................. C04B 35/591
                                                        501/97.4
5,344,634 A * 9/1994 Edler .................... C04B 35/591
                                                        423/406

(Continued)

OTHER PUBLICATIONS

Kang N. Lee et al., "Rare earth silicate environmental barrier coatings for SiC/SiC composites and $Si_3N_4$ ceramics," *Journal of the European Ceramic Society*, 25, 10 (2005) pp. 1705-1715.

*Primary Examiner* — Marla D McConnell
*Assistant Examiner* — Kevin Worrell
(74) *Attorney, Agent, or Firm* — Shumaker & Sieffert, P.A.

(57) ABSTRACT

A method of forming a barrier layer on a ceramic matrix composite (CMC) is described. The method includes forming a particulate surface layer comprising silicon particles on an outer surface of a fiber preform. The particulate surface layer is nitrided to convert the silicon particles to silicon nitride particles. After the nitriding, the fiber preform and the particulate surface layer are infiltrated with a molten material comprising silicon. Following infiltration, the molten material is cooled, thereby forming a ceramic matrix composite with a barrier layer thereon, where the barrier layer comprises silicon nitride and less than 5 vol. % free silicon. The barrier layer may also include silicon carbide and/or one or more refractory metal silicides.

19 Claims, 1 Drawing Sheet

102 → Forming a particulate surface layer comprising silicon particles on an outer surface of a fiber preform 104 → Nitriding the particulate surface layer to convert the silicon particles to silicon nitride particles 106 → After the nitridation, infiltrating the fiber preform and the particulate surface layer with a molten material comprising silicon 108 → Following infiltration, cooling the molten material to form a ceramic matrix composite (CMC) with a barrier layer thereon

(56)         References Cited

U.S. PATENT DOCUMENTS

| | | | |
|---|---|---|---|
| 5,498,760 A * | 3/1996 | Piketty-Leydier | C04B 41/89 |
| | | | 427/454 |
| 2009/0162556 A1 * | 6/2009 | Boutwell | C23C 26/00 |
| | | | 106/287.18 |
| 2014/0272344 A1 * | 9/2014 | Wan | C04B 41/5066 |
| | | | 427/419.7 |
| 2016/0145159 A1 * | 5/2016 | Landwehr | C23C 28/042 |
| | | | 427/249.2 |
| 2018/0194691 A1 * | 7/2018 | Shim | F01D 9/02 |

* cited by examiner

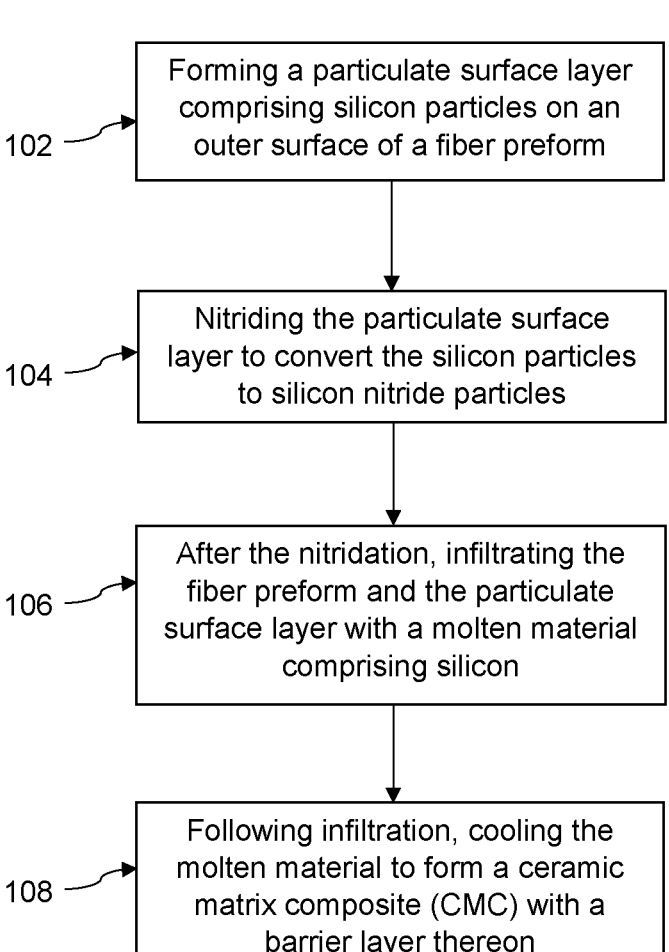

102 — Forming a particulate surface layer comprising silicon particles on an outer surface of a fiber preform 104 — Nitriding the particulate surface layer to convert the silicon particles to silicon nitride particles 106 — After the nitridation, infiltrating the fiber preform and the particulate surface layer with a molten material comprising silicon 108 — Following infiltration, cooling the molten material to form a ceramic matrix composite (CMC) with a barrier layer thereon

METHOD OF FORMING A BARRIER LAYER ON A CERAMIC MATRIX COMPOSITE

RELATED APPLICATION

The present patent document claims the benefit of priority under 35 U.S.C. § 119(e) to U.S. Provisional Patent Application No. 62/876,885, which was filed on Jul. 22, 2019, and is hereby incorporated by reference in its entirety.

TECHNICAL FIELD

The present disclosure relates generally to the fabrication of ceramic matrix composites (CMCs) and more particularly to formation of a diffusion barrier on CMCs.

BACKGROUND

Ceramic matrix composites, which include ceramic fibers embedded in a ceramic matrix, exhibit a combination of properties that make them promising candidates for industrial applications, such as gas turbine engines, that demand excellent thermal and mechanical properties along with low weight. In use in a high temperature environment, a ceramic matrix composite (CMC) component may be exposed to water vapor, oxygen or other chemical species that can detrimentally affect the mechanical properties of the component and potentially reduce operating lifetime. Accordingly, an environmental barrier coating may be applied to an outer surface of the CMC component to serve as a protective coating. Even with such a protective coating, however, chemical species such as oxygen may still diffuse into the CMC component in high temperature operating environments.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

FIG. 1 is a flow chart of an exemplary method of forming a barrier layer on a ceramic matrix composite.

DETAILED DESCRIPTION

A method of forming a barrier layer on a ceramic matrix composite (CMC) has been developed and is described in reference to the flow chart of FIG. 1. For some applications, the barrier layer may function as a diffusion barrier between the surface of the CMC and an overlying environmental barrier coating (EBC) or as an isolation layer between the CMC and a metallic component. Also or alternatively, the barrier layer may enhance the ease with which silicon surface nodules formed during fabrication may be removed from the surface of the CMC.

The method includes forming 102 a particulate surface layer comprising silicon particles on an outer surface of a fiber preform. The particulate surface layer is nitrided 104 to convert the silicon particles to silicon nitride particles. After the nitriding, the fiber preform and the particulate surface layer are infiltrated 106 with a molten material comprising silicon. Following infiltration, the molten material is cooled 108 to form a ceramic matrix composite with a barrier layer thereon. The barrier layer comprises silicon nitride and includes less than 5 vol. % unreacted (or "free") silicon. The barrier layer may also include some amount of silicon carbide and, in some cases, one or more refractory metal silicides. The barrier layer may serve as the outer layer of the CMC or, as indicated above, may function as an interface between the CMC and a metallic component or between the CMC and an EBC applied in a later processing step.

The particulate surface layer may be formed by application of a slurry or a tape comprising the silicon particles to the outer surface of the fiber preform. The particulate surface layer (and the slurry or tape) may include additional particles besides silicon particles that may facilitate obtaining the desired composition of the barrier layer. The additional particles may comprise a matrix material (e.g., silicon carbide) and/or a reactive element (e.g., carbon and/or a refractory metal) that can undergo a reaction during nitridation or melt infiltration. For example, the additional particles may be selected from among the following: silicon nitride particles, silicon carbide particles, carbon particles, and refractory metal particles (e.g., molybdenum particles and/or tungsten particles). Carbon and/or refractory metal particles, when present in the particulate surface layer, may react with the silicon-containing molten material during infiltration to form silicon carbide and/or one or more refractory metal silicides. The particulate surface layer may comprise a volume ratio of the additional particles to the silicon particles of about 5:1 to about 1:1. The additional particles may be incorporated into the particulate surface layer along with the silicon particles as described below (e.g., via application of a slurry or a tape to the outer surface of the fiber preform). Typically, the barrier layer formed following nitridation and melt infiltration includes from about 50 vol. % to about 90 vol. % silicon nitride, from about 10 vol. % to about 50 vol. % silicon carbide, and from 0 vol. % to about 30 vol. % refractory metal silicide(s), such as molybdenum silicide and/or tungsten silicide. The barrier layer may have a thickness in a range from about 50 microns to about 150 microns, or from about 75 microns to about 125 microns.

The nitriding may entail exposing the particulate surface layer to a gas comprising $N_2$ and/or $NH_3$. In other words, the nitriding of the particulate surface layer may be carried out in a gaseous atmosphere comprising $N_2$ and/or $NH_3$. The exposure to the gas may occur at a temperature ("nitridation temperature") in a range from about 1300° C. to about 1500° C., and more typically from 1300° C. to about 1400° C. Since the melting temperature of silicon is 1414° C., some melting of the silicon particles in the particulate surface layer may occur during nitriding, depending on the nitridation temperature. In this case, a solid shell of silicon nitride may form around the molten silicon, and diffusion of nitrogen into the particle may be expedited. The exposure to the gas may take place at a pressure in a range from about 100 Torr (about 13 kPa) to 765 Torr (about 102 kPa), and more preferably from 500 Torr (about 67 kPa) to about 765 Torr (about 102 kPa). Advantageously, the exposure to the gas is carried out in a controlled environment, such as an inert gas or vacuum environment, which is substantially devoid of oxygen; in other words, the controlled environment does not include oxygen beyond unavoidable impurity levels. Typically, nitridation takes place for a time duration from 2 hours to about 6 hours.

As indicated above, the particulate surface layer may be formed by application of a slurry or a tape comprising the silicon particles to the outer surface of the fiber preform. For example, a slurry comprising the silicon particles and optionally the additional particles dispersed in a liquid carrier may be applied to the outer surface using a method such as spraying, dipping, or spin casting. After drying to remove the liquid carrier, the silicon particles and the additional particles, when present, may be deposited on the outer surface to form the particulate surface layer. The drying may be expedited by exposing the slurry to a temperature in a range from 40° C. to about 150° C., optionally in a controlled environment, such as an inert gas atmosphere or vacuum. Alternatively, the drying may entail air drying under ambient conditions, e.g., atmospheric pressure and/or a temperature of 20-25° C. The liquid carrier in which the particles are dispersed may be an aqueous or organic solvent, such as water, ethanol, methanol, isopropyl alcohol, methyl ethyl ketone, and/or toluene. The slurry may further include a binder, such as polyethylene glycol, an acrylate co-polymer, a latex co-polymer, and/or polyvinyl butyral, and/or a dispersant, such as ammonium polyacrylate, polyvinyl butyral, a phosphate ester, polyethylene imine, or BYK® 110 (Byk USA, Wallingford, CT).

The particulate surface layer may alternatively be formed by attaching a tape comprising the silicon particles (and optionally the additional particles) to the outer surface. The tape may be prepared by tape casting a water-based slurry comprising the silicon particles, the optional additional particles, the organic binder, a dispersant, a surfactant and/or a plasticizer onto a flexible polymeric sheet, followed by drying of the slurry and separation of the tape from the polymeric sheet. Typically, the tape has a solids loading of about 50-70 vol. %. To promote adhesion, a polymeric adhesive, which may comprise the organic binder of the tape, may be deposited on the outer surface prior to applying the tape.

It is understood that at least one tape is applied to the outer surface; however, additional tapes may be applied as needed to cover some or all of the outer surface and/or to provide the desired thickness. Accordingly, the term "tape" as used in this disclosure is understood to refer to any and/or all tapes applied to the outer surface. When more than one tape is employed, the tapes may be applied in an overlapping or non-overlapping configuration on the outer surface.

Upon application of a suitable pressure and temperature, such as 80° C. to about 200° C. and/or 500 psi to about 50,000 psi (50 ksi), the silicon particles (and any additional particles) may be consolidated and bonded to the outer surface, thereby forming the particulate surface layer. The consolidation and bonding may be carried out using vacuum bagging, autoclaving, laminating, and/or mechanical pressing, typically in a controlled environment (e.g., a vacuum or inert gas atmosphere). The heat and pressure may be applied for a time duration in a range from about 30 minutes to about 2 hours.

The reaction of silicon to silicon nitride (e.g., Si to $Si_3N_4$) may be associated with a volumetric expansion of about 300-400%. Thus, during the nitriding, volumetric expansion and particle sintering may occur, such that the particulate surface layer increases in density. Some volumetric expansion may also occur as silicon reacts to form silicon carbide (e.g., Si to SiC) during melt infiltration, contributing to densification. In addition, molten silicon exhibits an approximately 11% volumetric expansion upon solidification. Accordingly, excess silicon can bulge through the outer surface of the infiltrated preform during cooling, forming silicon surface nodules on the barrier layer that can negatively impact dimensional tolerances of the ceramic matrix composite (CMC). Thus, the method may further comprise, after forming the barrier layer, removing any silicon nodules that may have formed during melt infiltration. Advantageously, due to the low wettability of molten silicon on silicon nitride, the silicon nodules may be readily removed.

The high contact angle of molten silicon with silicon nitride (e.g., greater than 90°) leads to the formation of highly spherical, loosely bound silicon nodules on the barrier layer that may be removed without machining or heat treatment.

The fiber preform on which the particulate surface layer is formed comprises a three-dimensional framework of ceramic fibers, which may be arranged in tows. The framework may be formed by, in one example, laying up plies comprising tows of ceramic fibers arranged in a two- or three-dimensional weave. Before or after forming the framework, an interface coating may be deposited on the ceramic fibers to provide a weak fiber-matrix interface, which may be beneficial for fracture toughness once the ceramic matrix composite is formed. Also or alternatively, a matrix material such as silicon carbide may be deposited on the fiber preform via chemical vapor infiltration or another deposition process known in the art to form a rigidized fiber preform. The fiber preform, which may be a rigidized fiber preform as described above, may be infiltrated with a slurry comprising ceramic particles and optionally reactive elements (e.g., carbon and/or refractory metal particles) to form an impregnated fiber preform, i.e., a fiber preform loaded with particulate matter. Thus, the method may further comprise, prior to forming the particulate surface layer, infiltrating the fiber preform with a slurry comprising the ceramic particles and optional reactive elements to form the impregnated fiber preform. Typically, the impregnated fiber preform comprises a loading level of particulate matter from about 40 vol. % to about 60 vol. %, with the remainder being porosity.

The molten material infiltrated into the fiber preform (which may be a rigidized and/or impregnated fiber preform as described above) and the particulate surface layer may comprise silicon or a silicon alloy (e.g., a silicon-rich alloy) and any incidental impurities. Melt infiltration may be carried out at a temperature at or above the melting temperature of silicon, which is 1414° C. Thus, the temperature for melt infiltration is typically in a range from about 1414° C. to about 1500° C. Melt infiltration may be carried out for a time duration of 15 minutes to four hours, typically from one to three hours, depending in part on the size and complexity of the ceramic matrix composite to be formed. The barrier layer and the ceramic matrix are formed from ceramic particles as well as ceramic reaction products created from the reaction between the molten material and any reactive elements (e.g., carbon particles, refractory metal particles) in the particulate surface layer and the fiber preform, respectively.

The ceramic fibers that serve as the framework of the fiber preform typically comprise silicon carbide, but may also or alternatively comprise another ceramic, such as silicon nitride, alumina, or aluminosilicate, or carbon. The ceramic matrix composite typically has a matrix comprising silicon carbide. A ceramic matrix composite that includes a silicon carbide matrix reinforced with silicon carbide fibers may be referred to as a silicon carbide/silicon carbide composite or SiC/SiC composite. The ceramic matrix composite may form part or all of a component of a gas turbine engine, such as a blade or vane.

EXAMPLE

An aqueous slurry including silicon particles is applied by dipping or spraying to an outer surface of a SiC fiber preform and dried to form a particulate surface layer. The particulate surface layer is nitrided in an ammonia ($NH_3$) atmosphere at 500 Torr for 4 hours at a temperature of 1350° C. to convert the silicon particles to silicon nitride particles.

X-ray diffraction analysis of the particulate surface layer obtained after nitridation reveals both Si and $Si_3N_4$ diffraction peaks, thus confirming the formation of silicon nitride.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of forming a barrier layer on a ceramic matrix composite (CMC) that comprises forming a particulate surface layer on an outer surface of a fiber preform, the particulate surface layer including silicon particles; nitriding the particulate surface layer to convert the silicon particles to silicon nitride particles; after the nitriding, infiltrating the fiber preform and the particulate surface layer with a molten material comprising silicon; and after infiltration, cooling the molten material, thereby forming a ceramic matrix composite with a barrier layer thereon, the barrier layer comprising silicon nitride and less than 5 vol. % free silicon.

A second aspect relates to the method of the first aspect, wherein forming the particulate surface layer comprises applying a slurry or a tape comprising the silicon particles to the outer surface of the fiber preform.

A third aspect relates to the method of the second aspect, wherein the slurry further includes a liquid carrier comprising an aqueous or organic solvent, the silicon particles being dispersed in the liquid carrier; and further comprising, after the applying, drying the slurry to remove the liquid carrier and deposit the silicon particles on the outer surface.

A fourth aspect relates to the method of the second or third aspect, wherein applying the slurry comprises spraying, dipping, or spin casting.

A fifth aspect relates to the method of the second aspect, further comprising, prior to applying the tape comprising the silicon particles, depositing a polymeric adhesive on the outer surface.

A sixth aspect relates to the method of any preceding aspect, wherein the particulate surface layer formed on the outer surface of the fiber preform comprises additional particles selected from the group consisting of: silicon nitride particles, silicon carbide particles, carbon particles, and refractory metal particles.

A seventh aspect relates to the method of the sixth aspect, wherein the refractory metal particles comprise molybdenum particles and/or tungsten particles.

An eighth aspect relates to the method of the sixth or seventh aspect, wherein the particulate surface layer comprises a volume ratio of the additional particles to the silicon particles of about 5:1 to about 1:1.

A ninth aspect relates to the method of any preceding aspect, wherein the barrier layer further comprises silicon carbide.

A tenth aspect relates to the method of any preceding aspect, wherein the barrier layer further comprises a refractory metal silicide.

An eleventh aspect relates to the method of any preceding aspect, wherein, during the nitriding, volume expansion and particle sintering occur, the particulate surface layer thereby increasing in density.

A twelfth aspect relates to the method of any preceding aspect, wherein the nitriding comprises exposing the particulate surface layer to a gas comprising $N_2$ and/or $NH_3$.

A thirteenth aspect relates to the method of the twelfth aspect, wherein the exposure to the gas occurs at a temperature in a range from about 1300° C. to about 1500° C.

A fourteenth aspect relates to the method of the twelfth or thirteenth aspect, wherein the exposure to the gas occurs at a pressure in a range from about 500 Torr to about 765 Torr.

A fifteenth aspect relates to the method of any of the twelfth through the fourteenth aspects, wherein the exposure to the gas is carried out in a controlled environment substantially devoid of oxygen.

A sixteenth aspect relates to the method of any preceding aspect, further comprising, after forming the ceramic matrix composite with the barrier layer thereon, removing any silicon nodules from the barrier layer without machining or heat treatment, the silicon nodules comprising a substantially spherical shape.

A seventeenth aspect relates to the method of any preceding aspect, wherein the barrier layer includes from about 50 vol. % to about 90 vol. % silicon nitride, from about 10 vol. % to about 50 vol. % silicon carbide, and from 0 vol. % to about 30 vol. % one or more refractory metal silicides.

An eighteenth aspect relates to the method of any preceding aspect, wherein the barrier layer comprises a thickness in a range from about 75 microns to about 125 microns.

A nineteenth aspect relates to the method of any preceding aspect, wherein the fiber preform is an impregnated fiber preform, and further comprising, prior to forming the particulate surface layer, infiltrating the fiber preform with a slurry comprising ceramic particles to form the impregnated fiber preform.

A twentieth aspect relates to the method of any preceding aspect, wherein the fiber preform comprises silicon carbide fibers, wherein the ceramic matrix composite comprises a ceramic matrix including silicon carbide, and wherein a component of a gas turbine engine comprises the ceramic matrix composite with the barrier layer thereon.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of forming a barrier layer on a ceramic matrix composite (CMC), the method comprising:
   forming a particulate surface layer on outer surfaces of a fiber preform, the particulate surface layer including silicon particles;
   nitriding the particulate surface layer to convert the silicon particles to silicon nitride particles and increase a density of the particulate surface layer;

after the nitriding, infiltrating the fiber preform and the particulate surface layer with a molten material comprising silicon; and after infiltration, cooling the molten material, thereby forming a ceramic matrix composite with a barrier layer thereon, the barrier layer comprising silicon nitride and less than 5 vol. % free silicon.

2. The method of claim 1, wherein forming the particulate surface layer comprises applying a slurry or a tape comprising the silicon particles to all of the outer surface of the fiber preform.

3. The method of claim 2, wherein the slurry further includes a liquid carrier comprising an aqueous or organic solvent, the silicon particles being dispersed in the liquid carrier; and further comprising, after the applying, drying the slurry to remove the liquid carrier and deposit the silicon particles on the outer surface.

4. The method of claim 2, wherein applying the slurry comprises spraying, dipping, or spin casting.

5. The method of claim 2, further comprising, prior to applying the tape comprising the silicon particles, depositing a polymeric adhesive on the outer surface, and further comprising, after applying the tape, applying heat and pressure to consolidate and bond the silicon particles to the outer surface.

6. The method of claim 1, wherein the particulate surface layer formed on the outer surface of the fiber preform comprises additional particles selected from the group consisting of: silicon nitride particles, silicon carbide particles, carbon particles, and refractory metal particles.

7. The method of claim 6, wherein the refractory metal particles comprise molybdenum particles and/or tungsten particles.

8. The method of claim 6, wherein the particulate surface layer comprises a volume ratio of the additional particles to the silicon particles of about 5:1 to about 1:1.

9. The method of claim 1, wherein the barrier layer further comprises silicon carbide.

10. The method of claim 1, wherein the barrier layer further comprises a refractory metal silicide.

11. The method of claim 1, wherein, during the nitriding, volume expansion and particle sintering occur to increase the density of the particulate surface layer.

12. The method of claim 1, wherein the nitriding comprises exposing the particulate surface layer to a gas comprising $N_2$ and/or $NH_3$.

13. The method of claim 12, wherein the exposure to the gas occurs at a temperature in a range from about 1300° C. to about 1500° C.

14. The method of claim 12, wherein the exposure to the gas occurs at a pressure in a range from about 500 Torr to about 765 Torr.

15. The method of claim 12, wherein the exposure to the gas is carried out in a controlled environment substantially devoid of oxygen.

16. The method of claim 1, further comprising, after forming the ceramic matrix composite with the barrier layer thereon, removing any silicon nodules from the barrier layer without machining or heat treatment, the silicon nodules comprising a substantially spherical shape.

17. The method of claim 1, wherein the barrier layer includes from about 50 vol. % to about 90 vol. % silicon nitride, from about 10 vol. % to about 50 vol. % silicon carbide, and from 0 vol. % to about 30 vol. % one or more refractory metal silicides.

18. The method of claim 1, wherein the barrier layer comprises a thickness in a range from about 75 microns to about 125 microns.

19. The method of claim 1, wherein the fiber preform is an impregnated fiber preform, and further comprising, prior to forming the particulate surface layer, infiltrating the fiber preform with a slurry comprising ceramic particles to form the impregnated fiber preform.

* * * * *